No. 787,144. PATENTED APR. 11, 1905.
J. BROPSON.
PIPE UNION.
APPLICATION FILED JUNE 18, 1904.

Witnesses:
Geo. B. Tibbitts
E. A. Tibbitts

Inventor:
James Bropson.
per Geo. W. Tibbitts
Attorney.

No. 787,144.  
Patented April 11, 1905.

UNITED STATES PATENT OFFICE.

JAMES BROPSON, OF CLEVELAND, OHIO.

PIPE-UNION.

SPECIFICATION forming part of Letters Patent No. 787,144, dated April 11, 1905.

Application filed June 18, 1904. Serial No. 213,141.

*To all whom it may concern:*

Be it known that I, JAMES BROPSON, a citizen of the United States of America, and a resident of Cleveland, Cuyahoga county, and State of Ohio, have invented certain new and useful Improvements in Pipe-Unions, of which the following is a specification.

This invention relates to pipe-unions, and has for its object to provide a simple and economical means for making and seating a washer or packing-ring when screwing up the union.

It consists in constructing that part of union having the seat for the washer with sharpened edges to the circular flanges surrounding the seat, whereby the washer is cut and seated by a blow of a hammer, thereby greatly facilitating the work, saving much time, labor, and annoyance of cutting and fitting of washers by hand for such purposes.

Figure 1:
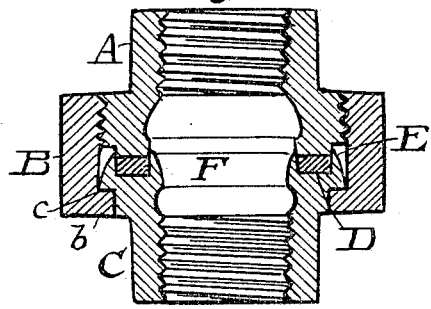
Figure 3:
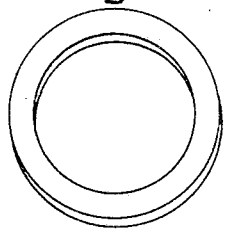
Figure 2:
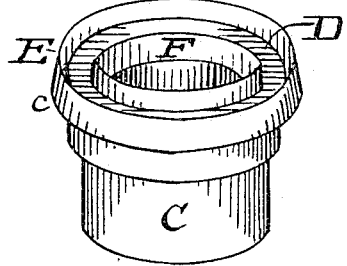

In the accompanying drawings, Figure 1 is a longitudinal section of a pipe-union, showing my improvement. Fig. 2 is a detached perspective view of the part of the union having the washer-seat, showing the cutting-flanges which make the washer shown in Fig. 3.

A represents that part of the union to which the union-nut B is screwed.

C is that part having the annular projection c, which is held by the annular flange b of the nut B and which contains the seat D. This seat is formed with the outer and inner annular flanges E F, the edges of which are sharpened to a cutting edge.

The method of use of this improvement is as follows: The part C is placed on a solid place, a piece of rubber or other suitable packing material is placed on the sharp flanges, then a piece of wood is placed on the rubber, and with a blow or two of a hammer on the wood the rubber is cut through and a ring-washer is made and seated in place. The center piece of the rubber is pushed out, and the union is ready to be put together. This saves all the time and labor usually required in cutting and fitting washers when done by hand. Such work is therefore very greatly facilitated, cheapened, and done better.

Having described my invention, what I claim is—

A pipe-coupling member having an annular face adapted to receive a washer and two concentric flanges bounding said face and sharpened to a cutting edge.

Signed by me at Cleveland, Ohio, this 15th day of June, 1904.

JAMES BROPSON.

Witnesses:
GEO. W. TIBBITTS,
GEO. B. TIBBITTS.